US009433878B2

(12) United States Patent
Sivaramakrishnan et al.

(10) Patent No.: US 9,433,878 B2
(45) Date of Patent: Sep. 6, 2016

(54) ELECTROSTATIC COALESCER FOR COALESCING A DISPERSED PHASE FROM A CONTINUOUS PHASE IN AN EMULSION

(71) Applicant: General Electric Company, Schenectady, NY (US)

(72) Inventors: Shyam Sivaramakrishnan, Schnectady, NY (US); Roderick Mark Lusted, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 331 days.

(21) Appl. No.: 14/068,457

(22) Filed: Oct. 31, 2013

(65) Prior Publication Data
US 2015/0114838 A1 Apr. 30, 2015

(51) Int. Cl.
*B01D 17/06* (2006.01)
*B01D 17/04* (2006.01)
*B03C 11/00* (2006.01)
*C10G 33/02* (2006.01)

(52) U.S. Cl.
CPC ............ *B01D 17/06* (2013.01); *B01D 17/045* (2013.01); *B03C 11/00* (2013.01); *C10G 33/02* (2013.01); *C10G 2300/1033* (2013.01); *C10G 2300/4037* (2013.01)

(58) Field of Classification Search
CPC ................................ B01D 17/06; C02F 1/46
See application file for complete search history.

(56) References Cited

U.S. PATENT DOCUMENTS 3,628,665 A 12/1971 Bakker
3,839,176 A * 10/1974 McCoy ............... B01D 17/047
204/560
4,203,849 A 5/1980 Ino et al.
4,257,895 A * 3/1981 Murdock ........... B01D 17/0211
210/243
4,530,767 A 7/1985 Hirs
4,534,860 A 8/1985 Budzich
(Continued)

FOREIGN PATENT DOCUMENTS

GB 2283928 A 5/1995
WO 2010022441 A1 3/2010
(Continued)

OTHER PUBLICATIONS

Shin et al., "Water-in-oil Coalescence in Micro-Nanofiber Composite Filters", AIChE Journal, Feb. 2004, vol. 50, Issue 2, pp. 343-350.
(Continued)

*Primary Examiner* — Nicholas A Smith
*Assistant Examiner* — Brian W Cohen
(74) *Attorney, Agent, or Firm* — Andrew J. Caruso

(57) ABSTRACT

An electrostatic coalescer for coalescing of a dispersed phase from a continuous phase in an emulsion is presented. The electrostatic coalescer includes at least one inlet for receiving the emulsion; at least one outlet for discharging the emulsion after coalescing the dispersed phase; and at least one electrode disposed between the inlet and the outlet, wherein the electrode is configured to receive an AC voltage/current from a power source. The electrostatic coalescer further includes at least one article disposed between the inlet and the outlet, the article includes a plurality of regions disposed on a surface in a predefined pattern, wherein a portion of the plurality of regions is substantially wetting with respect to the dispersed phase, and a portion of the plurality of regions is substantially non-wetting with respect to the dispersed phase.

18 Claims, 9 Drawing Sheets

(56) References Cited

U.S. PATENT DOCUMENTS

| | | |
|---|---|---|
| 5,242,604 A | 9/1993 | Young et al. |
| 5,494,586 A | 2/1996 | Inoue |
| 5,656,173 A | 8/1997 | Jordan et al. |
| 5,762,810 A | 6/1998 | Pelton et al. |
| 5,772,877 A | 6/1998 | Dvorchik et al. |
| 5,792,350 A | 8/1998 | Sorley et al. |
| 6,048,376 A | 4/2000 | Miller |
| 6,110,352 A | 8/2000 | Su et al. |
| 6,905,597 B2 | 6/2005 | Garbaty et al. |
| 6,997,974 B2 | 2/2006 | Tran et al. |
| 7,326,670 B2 | 2/2008 | DiLullo et al. |
| 7,416,657 B2 | 8/2008 | Kretchmar |
| 7,789,950 B2 | 9/2010 | Hoffman et al. |
| 2005/0026526 A1 | 2/2005 | Verdegan et al. |
| 2008/0257739 A1* | 10/2008 | Sams ............... B01D 17/045 204/554 |
| 2009/0178970 A1 | 7/2009 | Stanfel et al. |
| 2009/0246536 A1* | 10/2009 | Mitina ............... C03C 17/23 428/426 |
| 2010/0050871 A1 | 3/2010 | Moy et al. |
| 2010/0200512 A1 | 8/2010 | Chase et al. |
| 2010/0326922 A1 | 12/2010 | Varanasi et al. |
| 2011/0210061 A1 | 9/2011 | Li et al. |
| 2011/0229759 A1 | 9/2011 | Yazami et al. |
| 2011/0259796 A1 | 10/2011 | Chen et al. |
| 2012/0000853 A1 | 1/2012 | Tuteja et al. |
| 2012/0292252 A1 | 11/2012 | Chase et al. |
| 2013/0056407 A1 | 3/2013 | Parikh et al. |
| 2015/0203371 A1* | 7/2015 | Gschwend ........... B01D 17/045 210/776 |

FOREIGN PATENT DOCUMENTS

| | | | |
|---|---|---|---|
| WO | 2010151392 A1 | 12/2010 | |
| WO | WO 2013120753 A1 * | 8/2013 | ......... B01D 17/0214 |

OTHER PUBLICATIONS

Nand Lal Khatri, "Measurement and Modeling of Emulsion Layer Growth in Continuous Oil-Water Separations", University of Calgary, Department of Chemical and Petroleum Engineering, Jul. 2010, 161 Pages.

* cited by examiner

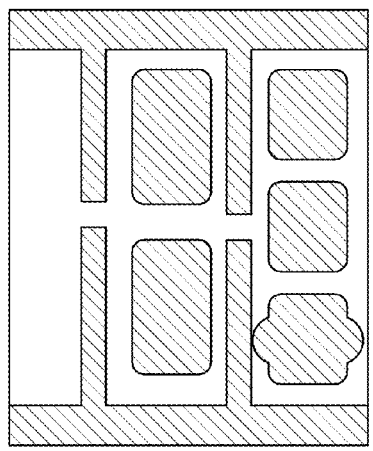
FIG. 6B
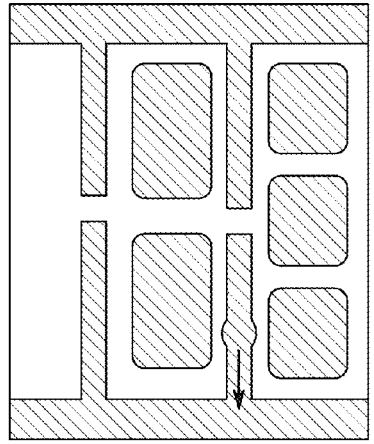
FIG. 6C
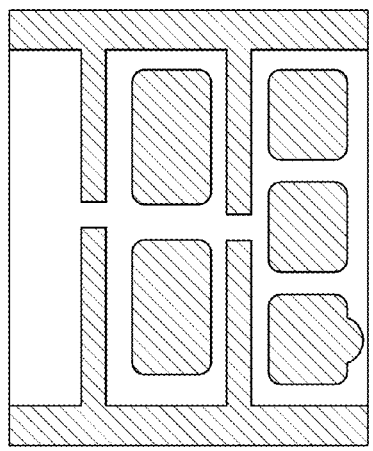
FIG. 6E
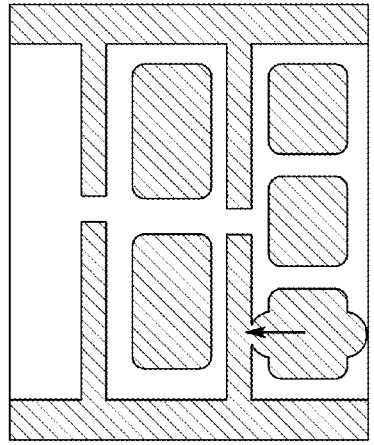
FIG. 6F
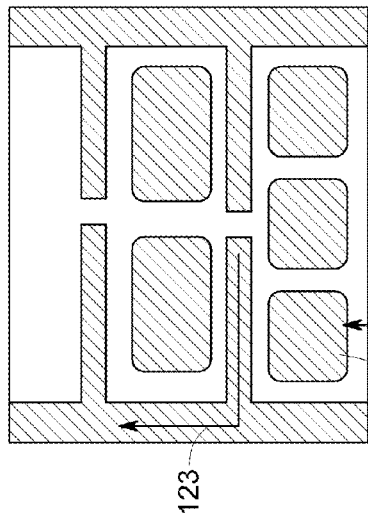
FIG. 6A
FIG. 6D

ELECTROSTATIC COALESCER FOR COALESCING A DISPERSED PHASE FROM A CONTINUOUS PHASE IN AN EMULSION

BACKGROUND OF THE INVENTION

The invention generally relates to an electrostatic coalescer for coalescing a dispersed phase from a continuous phase in an emulsion. Particularly, the invention relates to an electrostatic coalescer for coalescing oil in oil-water emulsions.

Separation of oil from water is one of the key processes in most oil recovery applications. The oil is typically mixed with water, which may be existent in a well or artificially injected to boost the rate of oil recovery. Oil-water separation is also commonly used to reduce the discharged oil fraction to comply with environmental regulations. Sub-sea separators can reduce the power needed to pump produced fluid from the sea bed to the top side, by separating out water from oil prior to pumping. For sub-sea oil recovery, there may be an economic incentive to make the separation coalescer efficient, compact, robust and durable.

Electrostatic separation of emulsions is commonly used in the chemical industry, especially in the petroleum industry. Such separation may be effected by using an electric field generated by means of electrodes immersed in the emulsion subjected to the separation process. When connected to a voltage source, the electrodes, which are immersed in the emulsion, cause the formation of an electric field. Phase separation may take place as a result of many processes connected with the presence of the electric field, such as polarization, dipole interaction or electrophoresis. For a water-in-oil emulsion, wherein the dispersed phase is water, fine droplets of the dispersed phase may coalesce to form bigger droplets. The separated phases of the mixture may be removed from the tank through outlets suitably located in the vessel. However, it may be desirable to improve the efficiency and reduce the size of current electrostatic coalescers, in particular for sub-sea applications.

Accordingly, there is a need for improved electrostatic coalescers. Further, it may be desirable to have electrostatic coalescers with improved coalescence efficiency.

BRIEF DESCRIPTION OF THE INVENTION

One embodiment is directed to an electrostatic coalescer for coalescing of a dispersed phase from a continuous phase in an emulsion. The electrostatic coalescer includes at least one inlet for receiving the emulsion; at least one outlet for discharging the emulsion after coalescing the dispersed phase; and at least one electrode disposed between the inlet and the outlet, wherein the electrode is configured to receive an AC voltage/current from a power source. The electrostatic coalescer further includes at least one article disposed between the inlet and the outlet, the article includes a plurality of regions disposed on a surface in a predefined pattern, wherein a portion of the plurality of regions is substantially wetting with respect to the dispersed phase, and a portion of the plurality of regions is substantially non-wetting with respect to the dispersed phase.

Another embodiment is directed to an electrostatic coalescer for coalescing of a dispersed phase from a continuous phase in an emulsion. The electrostatic coalescer includes at least one inlet for receiving the emulsion; at least one outlet for discharging the emulsion after coalescing the dispersed phase; and a plurality of electrodes disposed between the inlet and the outlet, wherein the plurality of electrodes is configured to receive an AC voltage/current from a power source. At least one electrode in the plurality of electrodes includes a plurality of regions disposed on a surface in a predefined pattern, wherein a portion of the plurality of regions is substantially wetting with respect to the dispersed phase, and a portion of the plurality of regions is substantially non-wetting with respect to the dispersed phase.

Another embodiment is directed to an electrostatic coalescer for coalescing of a dispersed phase from a continuous phase in an emulsion. The electrostatic coalescer includes at least one inlet for receiving the emulsion; at least one outlet for discharging the emulsion after coalescing the dispersed phase; and at least one electrode disposed between the inlet and the outlet, wherein the electrode is configured to receive an AC voltage/current from a power source. The electrostatic coalescer further includes at least one article disposed between the inlet and the outlet, the article includes a plurality of regions disposed on a surface in a predefined pattern, wherein a portion of the plurality of regions is substantially wetting with respect to the dispersed phase, and a portion of the plurality of regions is substantially non-wetting with respect to the dispersed phase. The pattern further includes a plurality of disconnected regions that are substantially wetting with respect to the dispersed phase, wherein the pattern defines at least one flow path for the continuous phase, and wherein the pattern defines at least one flow path for a coalesced dispersed phase to drain from the surface.

DRAWINGS

These and other features, aspects, and advantages of the present invention will become better understood when the following detailed description is read with reference to the accompanying drawings, in which like characters represent like parts throughout the drawings, wherein:

FIGS. 6a-6f illustrate a mechanism of oil capture by an article in accordance with some embodiments of the invention;

DETAILED DESCRIPTION

Figure 1:
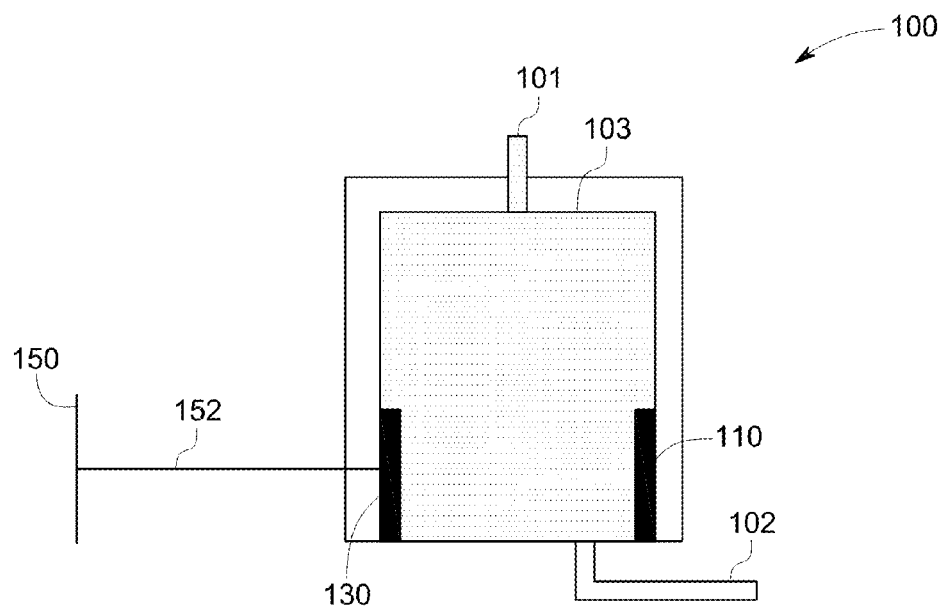
FIG. 1 illustrates an electrostatic coalescer in accordance with some embodiments of the invention.

The invention relates generally relates to an electrostatic coalescer for coalescing a dispersed phase from a continuous phase in an emulsion. Particularly, the invention relates to an electrostatic coalescer for coalescing oil in oil-water emulsions.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill, having the benefit of this disclosure.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As discussed in detail below, some embodiments of the invention are directed to an electrostatic coalescer for coalescing a dispersed phase from a continuous phase in an emulsion. The terms "electrostatic coalescer" and "coalescer" are used herein interchangeably, for the sake of brevity. The terms "coalescence" or "coalescing", as used herein, mean the joining of small droplets together to form larger droplets.

The term "emulsion", as used herein, includes a mixture of two or more immiscible liquids. In one embodiment, one component of the emulsion (also referred to as the dispersed phase) is stably or unstably dispersed in the other component (also referred to as the continuous phase). It may take seconds to hours to fully separate the mixture of phases in the emulsion by letting them stand undisturbed. In one embodiment, the dispersed phase includes an organic phase and the continuous phase includes an aqueous phase. In another embodiment, the dispersed phase includes an aqueous phase and the continuous phase includes an organic phase. The term "aqueous phase", as used herein, refers to a phase of the emulsion that primarily includes water. The term "organic phase", as used herein, refers to a phase of the emulsion that primarily includes hydrocarbons.

In some embodiments, the emulsion is of the type found in oil production. In some embodiments, the emulsion is of the type found in one or both of chemical production or biological production. In particular embodiments, the emulsion includes crude oil. In some embodiments, the crude oil includes liquid hydrocarbons. In some embodiments, the crude oil may further gaseous hydrocarbons, solid hydrocarbons, salts, metals, impurities, and combinations thereof. As noted earlier, in some embodiments, the crude oil further includes an aqueous component. In certain embodiments, the dispersed phase is oil and the continuous phase is water, and the emulsion is an oil-in-water emulsion. In such instances, the coalescer is configured to enhance coalescence of oil droplets in an oil-in-water emulsion.

FIG. 1 schematically represents an electrostatic coalescer 100, as per one embodiment of the invention. The coalescer 100 includes at least one inlet 101 for receiving the emulsion and at least one outlet 102 for discharging the emulsion after coalescing the dispersed phase. The coalescer 100 includes at least one electrode 130 disposed between the inlet 101 and the outlet 102, as indicated in FIG. 1. The coalescer 100 further includes at least one article 110 disposed between the inlet 101 and the outlet 102, as indicated in FIG. 1.

Figure 2:
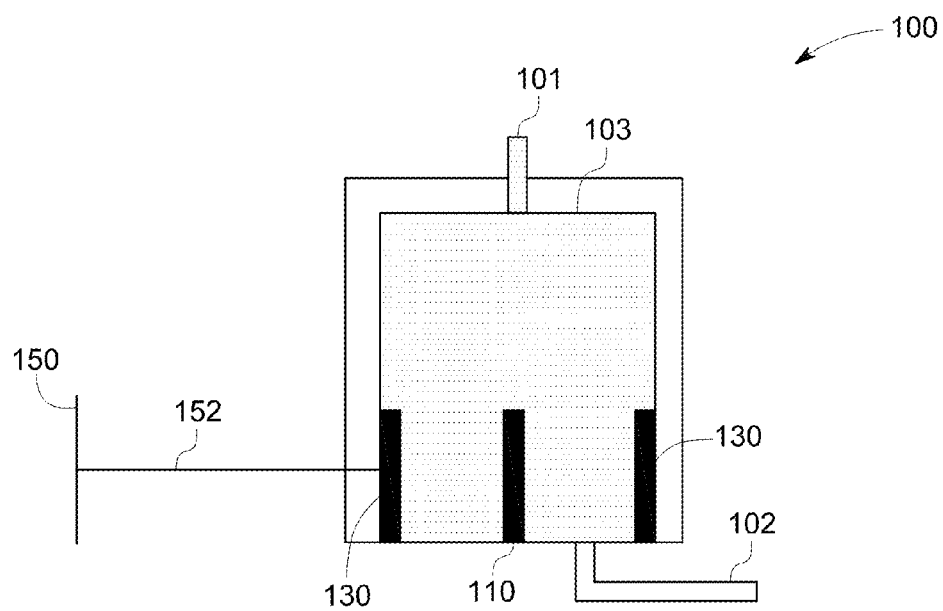
FIG. 2 illustrates an electrostatic coalescer in accordance with some embodiments of the invention.

As described in detail later, the article 110 may be charged, and may be itself capable of functioning as an electrode, in some embodiments. In such instances, the article 110 may function to enhance the coalescence, and also as an electrode. In some other embodiments, the article 110 may be uncharged, and the coalescer 100 may include one or more additional electrodes 130, as shown in FIG. 2. In such instances, the article 110 may primarily function to enhance the coalescence.

In some embodiments, as shown in FIG. 2, the coalescer 110 may include a plurality of electrodes 130 in fluid communication with the emulsion. The term "plurality of electrodes" as used herein means two or more electrodes. In some embodiments, the coalescer 110 further includes a separation vessel 103, and the plurality of electrodes 130 are disposed in an interior volume of the separation vessel 103, as indicated in FIG. 2. In particular embodiments, the plurality of electrodes 130 are disposed in the separation vessel 103 such that the plurality of electrodes 130 are positioned at the periphery of the separation vessel 103.

It should be noted that the two electrodes are shown as an exemplary embodiment only and the number of electrodes disposed within the coalescer may vary. The number of electrodes disposed within the coalescer 100 may be determined by the number of phases of the voltage source, the size of the separation vessel, or both.

In some embodiments, the plurality of electrodes 130 may have any suitable geometry depending on the geometry of the coalescer and/or the electrostatic field desired. In some embodiments, the plurality of electrodes 130 may be configured in the form of a sheet, a tube, a plate, or combinations thereof. In some embodiments, the plurality of electrodes 130 may be configured in the form of a plate. In some embodiments, the plurality of electrodes 130 may include a conductive portion and an insulating outer layer (not shown). In some embodiments, the plurality of electrodes 130 may include a copper-based conductive portion and an insulating outer layer. In some embodiments, the plurality of electrodes 130 are configured in the coalescer 110 such that the insulating outer layer of the plurality of electrodes 130 is in fluid communication with the emulsion.

As illustrated in FIG. 2, the coalescer 100 further includes the article 110. As alluded to previously, in some embodiments, the article 110 may also function as an electrode, and in such instances, the coalescer 110 may include three electrodes. In some other embodiments, the article 110 may be uncharged, and the coalescer 100 may include the two electrodes 130, and the article 110 configured to enhance the coalescence.

Referring again to FIGS. 1 and 2, at least one article 110 is disposed between the inlet 101 and the outlet 102. Non-limiting examples of suitable configurations for the article 110 include a plate, a tube, a needle, a sphere, a mesh, a grid, and combinations thereof. In some embodiments, the article includes a substantially planar surface. In some embodiments, the article is configured in the form of a plate. In some embodiments, the article is configured in the form of a substantially flat plate. The term "substantially flat" as used herein means that plate is free of ridges and grooves, such as, for example present in corrugated plates. Without being bound by theory, it is believed that a substantially flat surface may provide for reducing fouling and improved coalescence/separation efficiency over a period of time.

Figure 3:
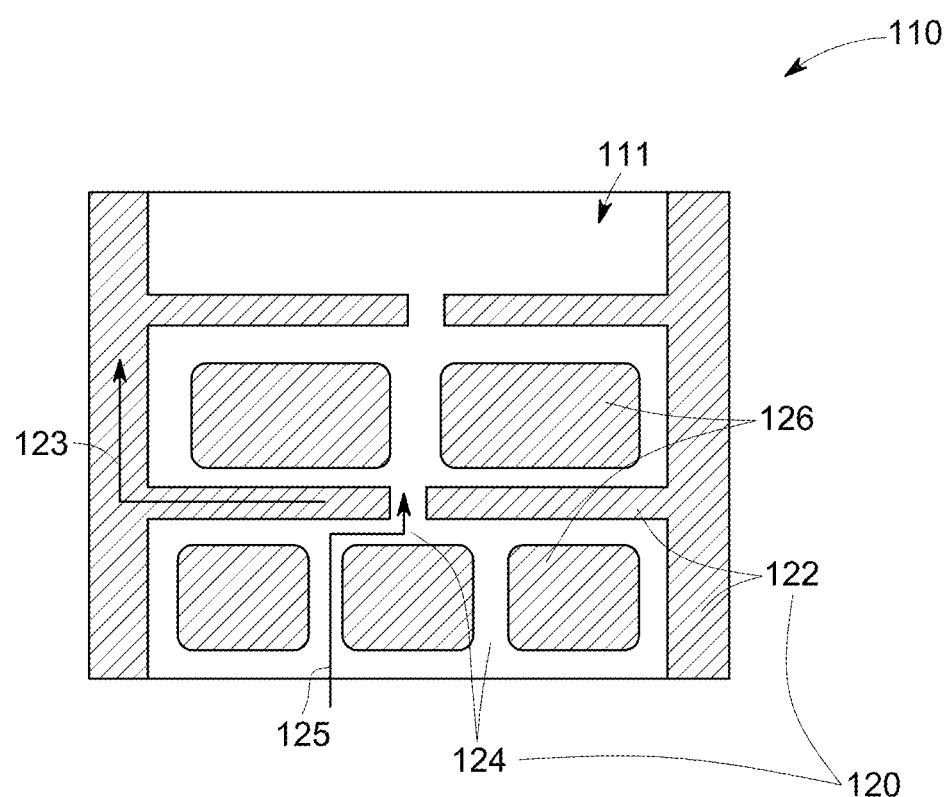
FIG. 3 illustrates a top-view of an article in accordance with some embodiments of the invention.

An article 110 in accordance with some embodiments of the invention is further schematically illustrated in FIG. 3. As illustrated in FIG. 3, the article 110 includes a surface 111. A plurality of regions 120 is further disposed on the 111 surface in a predefined pattern, as indicated in FIG. 3. A portion of the plurality of regions 122 is substantially wetting with respect to the dispersed phase, and a portion of the plurality of regions 124 is substantially non-wetting with respect to the dispersed phase.

The terms "substantially wetting" and "substantially non-wetting" as used herein are defined in terms of the contact angle defined by the dispersed phase (for example, oil) on the article's surface when surrounded by the continuous phase. As used herein, the term "contact angle" is the static angle formed between a stationary drop of a reference liquid and a horizontal surface upon which the droplet is disposed, as measured at the liquid/substrate interface in a continuous fluid medium. Contact angle of a drop of dispersed phase with a surface submerged inside the continuous phase may be used as a measure of the wettability of the surface. For example, if the dispersed phase liquid drop spreads completely on the surface and forms a film, the contact angle is 0 degrees. Thus, the term "substantially wetting" as used herein means that the contact angle of the dispersed phase with respect to the surface is less than 90 degrees. The term "substantially non-wetting" as used herein means that the contact angle of the dispersed phase with respect to the surface is greater than 90 degrees.

In some embodiments, the plurality of regions 122 are characterized by a contact angle with respect to the dispersed phase that is less than 90 degrees. In some embodiments, the plurality of regions 122 are characterized by a contact angle with respect to the dispersed phase that is less than 30 degrees. In some embodiments, the plurality of regions 122 are characterized by a contact angle with respect to the dispersed phase that is less than 10 degrees. In some embodiments, the plurality of regions 122 are characterized by a contact angle with respect to the dispersed phase that is in a range from about 0 degrees to about 60 degrees.

In some embodiments, the plurality of regions 124 are characterized by a contact angle with respect to the dispersed phase that is greater than 90 degrees. In some embodiments, the plurality of regions 124 are characterized by a contact angle with respect to the dispersed phase that is greater than 120 degrees. In some embodiments, the plurality of regions 124 are characterized by a contact angle with respect to the dispersed phase that is greater than 150 degrees. In some embodiments, the plurality of regions 124 are characterized by a contact angle with respect to the dispersed phase that is in a range from about 90 degrees to about 150 degrees.

Thus, by way of example, as noted earlier, the emulsion may include oil dispersed in water. In such instances, the plurality of regions 122 may be oleophilic and the plurality of regions 124 may be oleophobic. In some such instances, the plurality of regions 122 and 124 may be also characterized by the water contact angle in air. For example, in some such instances, the plurality of regions 122 may be hydrophobic and the plurality of regions 124 may be hydrophilic. In some other instances, the plurality of regions 122 may be oleophilic and the plurality of regions 124 may be hydrophilic.

The terms hydrophilic, hydrophobic, oleophilic and oleophobic refer to properties of the surface with air as the surrounding environment. Thus, a surface referred to as hydrophobic is substantially non-wetted by water when placed in air. A surface referred to as hydrophilic is substantially wetted by water when placed in air. A surface referred to as oleophobic is substantially non-wetted by oil when placed in air. A surface referred to as oleophilic is substantially wetted by oil when placed in air.

In some embodiments, the plurality of regions 122 may be superhydrophobic and the plurality of regions 124 may be hydrophilic. In some embodiments, the plurality of regions 122 may be hydrophobic and the plurality of regions 124 may be superhydrophilic. In certain embodiments, the plurality of regions 122 may be superhydrophobic and the plurality of regions 124 may be superhydrophilic. As used herein, the term "superhydrophobic" means that a water contact angle in air is greater than 150 degrees. As used herein, the term "superhydrophilic" means that a water contact angle in air is less than 10 degrees.

The hydrophobic or superhydrophobic regions may include any suitable hydrophobic material, such as, for example, a siloxane material, a silicate, a fluorinated material, a hydrocarbon material, a hydrophobic ceramic, a hydrophobic polymer, or combinations thereof. In some embodiments, the hydrophobic or superhydrophobic regions may include a fluorocarbon, such as, for example, a fluorocarbon polymer. In certain embodiments, the hydrophobic regions may include poly(tetrafluoroethylene).

Similarly, the hydrophilic or superhydrophilic regions may include any suitable hydrophilic material, such as, for example, a ceramic, glass, a hydrophilic polymer, a metal, a metal alloy, a metal oxide, or combinations thereof. In some embodiments, the hydrophilic regions may include a ceramic material, such as, for example, yttrium aluminum garnet. In certain embodiments, the hydrophilic regions may include a metal alloy, such as, for example steel.

In some embodiments, one or both of the hydrophobic regions and the hydrophilic regions may include a textured surface. The term "textured surface" as used herein means a plurality of features are disposed on the surface. Examples of such features include, without limitation, elevations (such as cylindrical posts, rectangular prisms, pyramidal prisms, dendrites, nanorods, nanotubes, particle fragments, abrasion marks, and the like); and depressions (such as holes, wells, and the like).

In some embodiments, the textured surface may be formed by roughening the surface, particle deposition, or combinations thereof. Texturing or roughening the surface may change the contact angle of water on the surface. A texture that increases the tortuosity of the surface but maintains the contact between the water droplet and the surface may result in increasing the contact angle of a hydrophobic material and decreasing the contact angle of a hydrophilic material.

In some embodiments, the plurality of regions 120 may include textured hydrophilic regions. In some such instances, at least a portion of the plurality of regions 124 may include a hydrophilic material that is textured. Non-limiting examples of suitable textured hydrophilic regions may include, roughened steel, ceramic nanoparticle coating, or combinations thereof. In some embodiments, the plurality of regions 120 may include hierarchical textured superhydrophilic regions, that is, textures or features having dimensions of one scale on top of features having dimensions of another scale. In some embodiments, the plurality of regions 120 may include nano-textured superhydrophilic regions. In some embodiments, superhydrophilic surfaces may be desirable as they provide the lowest contact angle for oil in water on patterned areas, which turn superhydrophobic, as well as lowest adhesion to oil on unpatterned areas which remain superhydrophilic.

Figure 4:
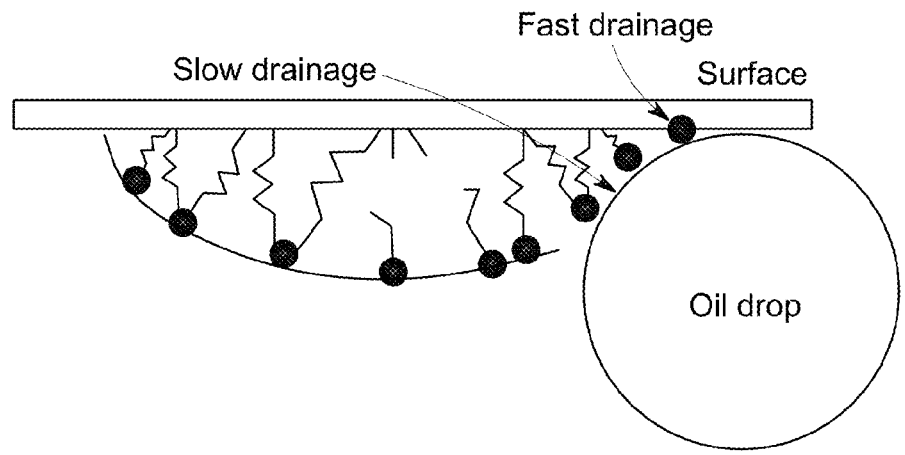
FIG. 4 illustrates a ball and stick model showing displacement of a sessile oil drop due to impinging oil drop.

As noted earlier, the plurality of regions 120 are disposed in a predefined pattern. In some embodiments, the pattern was defined to allow for creation of three-phase boundaries. The present inventors have surprisingly discovered that coalescence of free oil with sessile drops is instantaneous at three-phase oil-water-solid boundaries. The main difference between oil on a film and oil at a three-phase boundary is the ability of oil to deviate from its existing position when external forces are applied on it. Hence, when a new oil drop impinges on an oil film, all points on film's surface are free to move and the film itself may deform as a result of upward force exerted by incoming oil drop. In contrast, oil molecules at three-phase boundaries are not free to move because of surface adhesion forces. Hence, during formation of a water drainage layer, water may migrate into zones of oil deformation and drain away quickly from zones where oil is not free to deform, that is, three-phase boundaries. Without being bound by any theory, it is believed that the rapid drainage of water from the three-phase boundary hastens coalescence (as shown in FIG. 4).

The three-phase boundaries on the surface 111 may be created by forming regions 122, 124 and 126 on the surface in a pre-defined pattern. Without being bound by any theory, it is believed that the pattern of hydrophobic and hydrophilic regions, for example, may allow for creation of sessile oil drops and three-phase boundaries on such a surface.

In some embodiments, the pattern includes a plurality of inter-connected regions 124 that are substantially non-wetting with respect to the dispersed phase, as shown in FIG. 3. In some embodiments, the plurality of inter-connected regions 124 define at least one flow-path 125 for the continuous phase, as shown in FIG. 3. Thus, by way of example, the continuous phase may be water and the pattern may include a plurality of inter-connected hydrophilic or superhydrophilic regions 124.

Without being bound by any theory, it is believed that it may be desirable that the plurality of hydrophilic or superhydrophilic regions 124 define a substantially unrestricted path for water to flow from one edge of the article to the other. Thus, in some embodiments, the hydrophilic or superhydrophilic regions 124 are continuously connected such that the water move inwards from an edge and displaces oil adhered to the hydrophilic or superhydrophilic regions 124.

It may be also desirable to have defined paths in the pattern to drain the coalesced dispersed phase from the surface 111. In some embodiments, the pattern further defines at least one flow path 123 for a coalesced dispersed phase to drain from the surface 111, as indicated in FIG. 3. As shown in FIG. 3, in some embodiments, the flow path for the coalesced dispersed phase 123 includes a plurality of inter-connected regions 122 that are substantially wetting with respect to the dispersed phase. Thus, by way of example, the dispersed phase may be oil and the pattern may include a plurality of inter-connected hydrophobic or superhydrophobic regions 122. Further, in such instances, the plurality of inter-connected hydrophobic or superhydrophobic regions 122 define a flow path 123 for the coalesced oil to drain from the surface 111. In some embodiments, the flow-path(s) 123 may be configured to facilitate fast drainage of coalesced oil from the surface 111.

In some embodiments, the pattern further includes a plurality of disconnected regions 126 that are substantially wetting with respect to the dispersed phase, as shown in FIG. 3. Thus, by way of example, the dispersed phase may be oil and the pattern may include a plurality of disconnected hydrophobic or superhydrophobic regions 126. It should be noted that in FIG. 3, the disconnected regions 126 are shown as rectangular in shape, however, the regions 126 could have any suitable shape, for example, square, circle, ellipse, and the like.

In some embodiments, it may be desirable that the disconnected regions 126 are disposed proximate to the flow path for the coalesced oil droplets 123, such that, when they capture oil and expand in size, they can coalesce with the oil in the oil flow path 123, and revert back to their original size.

In certain embodiments, the pattern includes a plurality of disconnected regions 126 that are substantially wetting with respect to the dispersed phase. In some such embodiments, the pattern further defines at least one flow path 125 for the continuous phase, and further defines at least one flow path 123 for a coalesced dispersed phase to drain from the surface 111.

The width and spacing of the regions 122, 124, and 126 may be designed to allow for one or more of increased likelihood of capturing incoming oil drops, fast drainage of coalesced oil from the surface, and increased likelihood of water displacing oil from hydrophilic or superhydrophilic regions.

As mentioned previously, it may be desirable to increase the chance for droplets to meet three phase boundaries. When an incoming oil droplet hits the boundary of a sessile oil drop, coalescence may happen very quickly. Surfaces patterned with hydrophobic and hydrophilic regions tend to capture oil on the hydrophobic regions and be oil-free in the hydrophilic regions. By appropriately designing the surface patterns, the trapped oil on such surfaces may act as a speed bump for incoming drops that tend to glide along a surface. However, after reduction in speed, the oil drops may still glide away without coalescing on other oil drops sticking to the surface, as the oil coalescence may be hindered by water that surrounds the oil drops. To encourage coalescence, the trapped oil patterns on the surface may be designed such that the incoming drops follow a tortuous path with several chances of impacting a three-phase boundary, thereby increasing chances of coalescence.

Figure 5A:
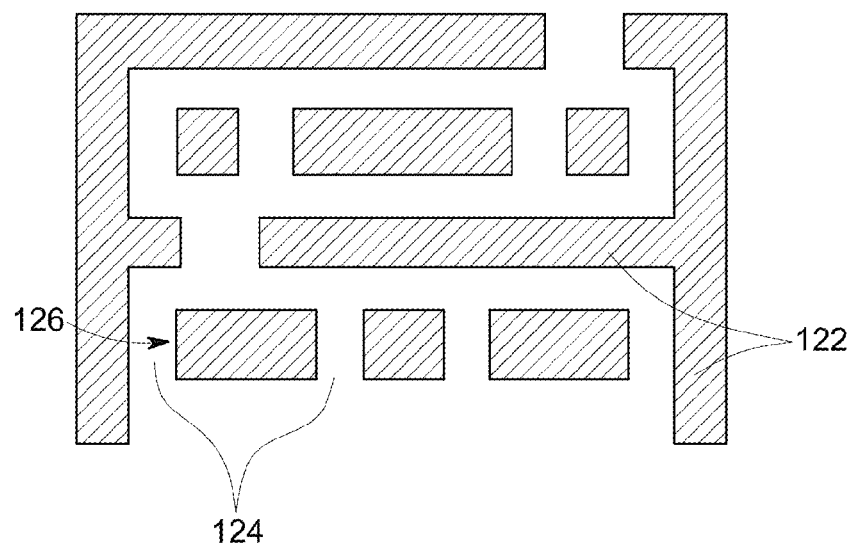
FIGS. 5a and 5b illustrate the patterns in accordance with some embodiments of the invention.
Figure 5B:
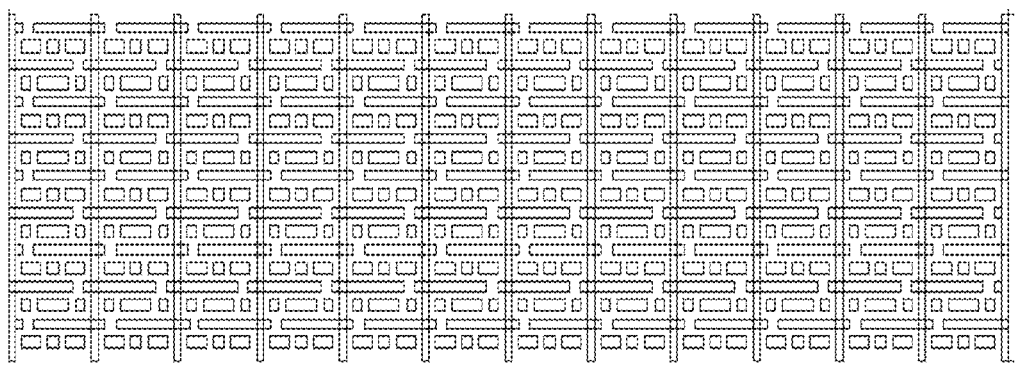

FIG. 5a illustrates an example of a representative pattern including a plurality of regions that are substantially wetting with respect to the dispersed phase 122, a plurality of regions that are substantially non-wetting with respect to the dispersed phase 124, and a plurality of disconnected regions 126 that are substantially wetting with respect to the dispersed phase. FIG. 5*b* further shows the patterns repeated along the horizontal direction of a plate.

FIG. 6 illustrates a mechanism of oil capture by article 110, in accordance with some embodiments of the invention. As illustrated in FIG. 6*a*, an incoming oil drop's motion is impeded by sessile disconnected oil bumps (regions 126) on the surface. In such instances, when an incoming drop impinges on the three-phase boundary of a sessile oil bump 126, coalescence happens immediately (FIGS. 6*b* and 6*c*). As more and more oil drops coalesce with the sessile oil bumps 126 (FIG. 6*d*), the size of the sessile bumps 126 grow until the oil in the bumps coalesce with the oil in the oil drainage paths 123 to release oil away from the disconnected bumps 126 (FIG. 6*e*). This release may be driven by buoyancy since the oil drainage path 123 is located proximate to the disconnected oil bump 126, as shown in FIG. 6*f*.

Figure 7A:
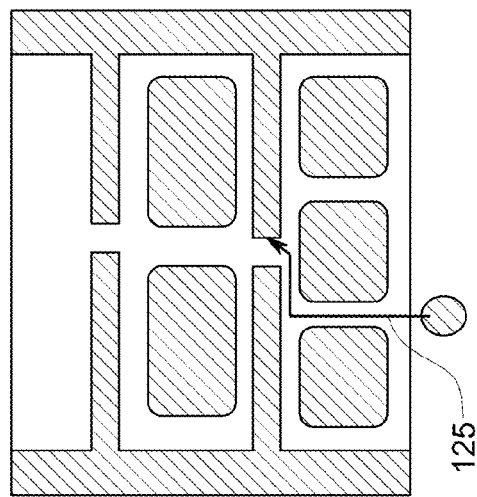
FIGS. 7a-7c illustrate a mechanism of oil capture by an article in accordance with some embodiments of the invention.
Figure 7B:
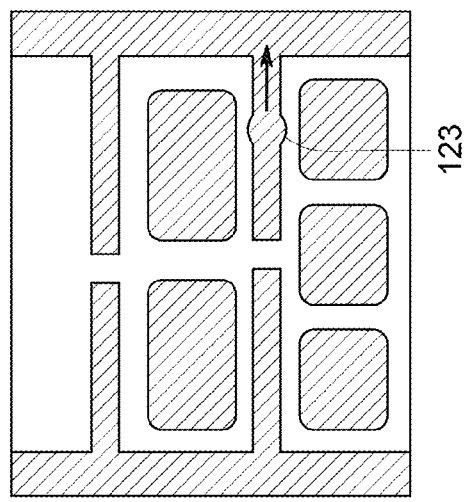
Figure 7C:
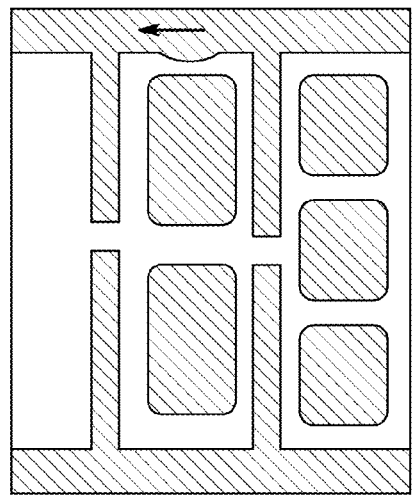

FIG. 7 illustrates a mechanism of oil capture by the article 110, in accordance with some other embodiments of the invention. In such instances, the oil drops follow the path of least resistance to the top of plate. In some embodiments, the oil drops may follow the path 125 for the continuous phase, as shown in FIG. 7*a*. In some such instances, as the oil follows the path 125, the oil drops may coalesce with the horizontal sections of the oil-drainage path 123, as shown in FIGS. 7*b* and 7*c*.

In some embodiments, the coalescer 100 may further include a power source 150 configured to supply an AC voltage/current to the electrode 130 and the article 110, as shown in FIG. 1, or to the plurality of electrodes 130, as shown in FIG. 2. The electrode 130 or the plurality of electrodes 130 are configured to receive an AC voltage/current from the power source 150, as shown in FIGS. 1 and 2. In some embodiments, as shown in FIG. 1, the article 110 may be further configured to receive an AC voltage/current from the power source 150 via the conductor 152.

In some embodiments, the coalescer 100, as indicated in FIGS. 1 and 2 may be used in advance of another piece of equipment wherein actual separation of dispersed and continuous phases takes place. In one embodiment, the coalescer 100 may be used in advance of a hydrocyclone, sometimes referred to as a vortex tube. In another embodiment, the coalescer 100 may be used in advance of a gravity separator. In such embodiments, the emulsion is treated in the coalescer to augment the size of water droplets prior to passage of the emulsion into the hydrocyclone or gravity separator, such that the increased size droplets are more efficiently separated by cyclonic or gravity action.

As alluded to previously, in conventional surfaces for enhancing coalescence of oil in oil-water emulsions, the coalescence efficiency of the surface decreases as it becomes covered with oil. In contrast, oil-resisting surfaces (for example, hydrophilic surfaces), which do not get covered by oil completely, tend to behave randomly over time. Embodiments of the present invention overcome these drawbacks of homogenous surfaces by introducing a pattern of hydrophobic and hydrophilic regions, designed to enhance coalescence and drainage of oil. Without being bound by any theory, it is believed that pattern of hydrophobic and hydrophilic regions impedes the motion of impinging oil drops, and creates oil-water-solid three phase boundaries, which may enhance speed of oil droplet coalescence. Further, in some embodiments, these patterns have been designed to release accumulated oil on the surface continuously, such that that the coalescer functions reliably over time.

In some embodiments, the coalescers of the present invention may be advantageously used for coalescing of emulsion wherein the coalescer is configured inline of the emulsion fluid flow. In some embodiments, the coalescers of the present invention may be used for coalescing of emulsion wherein the coalescers is configured in a sub-sea environment. As noted earlier, in some embodiments, coalescers of the present invention may advantageously provide for smaller, faster, inline electrostatic coalescence separators, which may be suited for subsea applications.

EXAMPLES

Example 1

Fabrication of Patterned Plates for Separation

Roughened steel plates with hydrophilic/phobic patterns, heretofore referred to as 'patterned steel plates' were made by cutting 6"×24" plates from ⅛" sheets of 2205 stainless steel. These plates were grit blasted on both sides using abrasives. The grit size was found to control easy release of oil when the surfaces were immersed in an oil-water environment. Small 4"×4" coupons were grit blasted with different grit sizes and for the same time duration. The grit blasted coupons were immersed into a bath (described below) to estimate the time required for oil release from the surface, and to allow it to get covered with water. After determining the appropriate grit size that provided fastest release of oil from the surface, the same grit size was selected for grit blasting all steel plates. Both sides of the steel plates were grit blasted to eliminate effects of bowing from roughening one side alone. Further, the roughness of each plate was measured and controlled during grit blasting.

It was also noted that the smooth steel surfaces did not release oil quickly in an oil/water environment. Rougher surfaces likely performed better because of the increase in oleophobic surface area seen by a sessile drop on the surface. The related phenomenon of roughness increasing the contact angles is known in the literature. It is also noted that the smooth surfaces could not adhere very well to the Teflon paint and hence rough surfaces were preferred.

The roughened plates were wiped with isopropyl alcohol (IPA) and coated with a pattern of horizontal and vertical stripes of Teflon. The Teflon paint was purchased in amorphous form dissolved in a solvent. The solvent evaporated within few minutes of the deposition to leave a dry film. The patterned plate was baked at 300 F for 10 minutes in an industrial oven with forced convection to improve adhesion of Teflon paint to surfaces.

Figure 8:
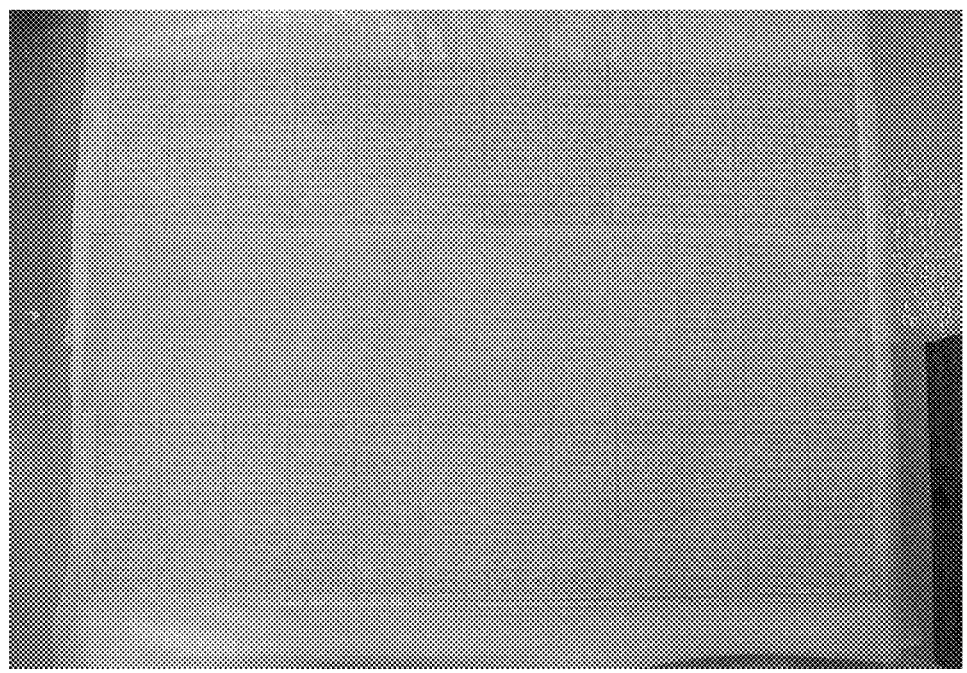
FIG. 8 shows a photograph of steel plates patterned using the process in accordance with some embodiments of the invention.

The Teflon paint was applied using a felt tip pen mounted on a computer controlled moving platform of an industrial cutting table. The felt tip pen was modified specially for the purpose of reliably depositing Teflon paint over a large area. At the end of each patterning process, the pen's reservoir was filled with Teflon paint to make up for the loss in weight. This process ensured excellent repeatability of Teflon patterns painted on all plates. FIG. 8 shows a photograph of steel plates patterned using the process described above.

Example 2

Fabrication of Patterned Nano-Plates for Separation

Superhydrophilic nano-textured ceramic plates patterned with Teflon paint, heretofore referred to as 'patterned nano-plates' were fabricated using a plasma spray process followed by stencil-based printing. A liquid fed radial injection plasma spray technique was used to create the nano-textured surfaces. Suitable plasma spray coating techniques is described in co-pending patent application Ser. No. 13/723,301, filed on 21 Dec. 2012; incorporated herein in its entirety, unless directly contradictory to the teachings described herein. Generally, a plasma spray technology involves melting small feed particles in a rotating plasma plume and spraying the same at high velocity using a robotic arm that rasters across the substrate.

Steel plates having dimensions 6"×24" were cut from 1/8" sheets of 2205 stainless steel, and were grit blasted prior to plasma spray coating to improve adhesion of the coating to the surface. Yttrium aluminum garnet (YAG) ceramic particles (<10 micron) were suspended in ethanol and were sprayed on the steel plates by the liquid fed radial injection plasma spray technique. Several spray parameters, for example, distance from the target, injector size and type, raster speed, slurry feed rate, slurry concentration, substrate temperature, and mean particle size of slurry, were optimized to obtain the nano-textures on surfaces. After the coating step was completed, the uncoated sides were heat treated to reduce bowing due to the coating process. Nano-textured ceramic coatings made by this process were typically about 10 microns to about 100 microns thick, and were super-hydrophilic.

These nano-textured surfaces were further patterned with Teflon paint using stencil printing and roll-on printer. The stencil-based painting process was optimized with respect to the stencil material, stencil thickness, paint applicator shape and size, application speed, application pressure, applicator wetness etc.

Based on trial and error, a few mils thick transparent plastic sheet was deemed to be an apt stencil since its thickness did not allow too much or too little contact between the roller and nano-surface. The transparency of the sheet allowed real-time assessment of bleeding and adjustments to the painting process. A relatively round paint head was found to be most effective in preventing bleeding of paint under the stencil as compared to flatter paint heads. The roller was kept relatively low on paint to further mitigate bleeding of paint. Given the relatively high volatility of the solvent, the roller could not be wetted from the inside without losing significant amount of paint to evaporation. So, the roller was recharged with paint by manually dropping a few milliliters of paint after running it dry. Similarly, a large roller area also increased rate of evaporation. Hence a 1" wide and a 0.5" thick roller was used to minimize evaporation. The roll painting process permitted coating of 5 6"×24" plates per operator per hour.

Patterned plates were heat treated at 300° F. for 10 minutes to improve adhesion of Teflon paint to the nano-textured ceramic surface. In some cases, the porous structure of the nano-coatings reduced the water-wicking hydrophilic ability of the coating. To improve the water wettability of these surfaces, the surfaces were exposed to flowing tap water such that the air trapped in the air pockets was ejected. These patterned surfaces were then tested for oil coalescence efficiency using the procedure described later.

Example 3

Test Setup for Coalescence Efficiency Measurement

Figure 9:
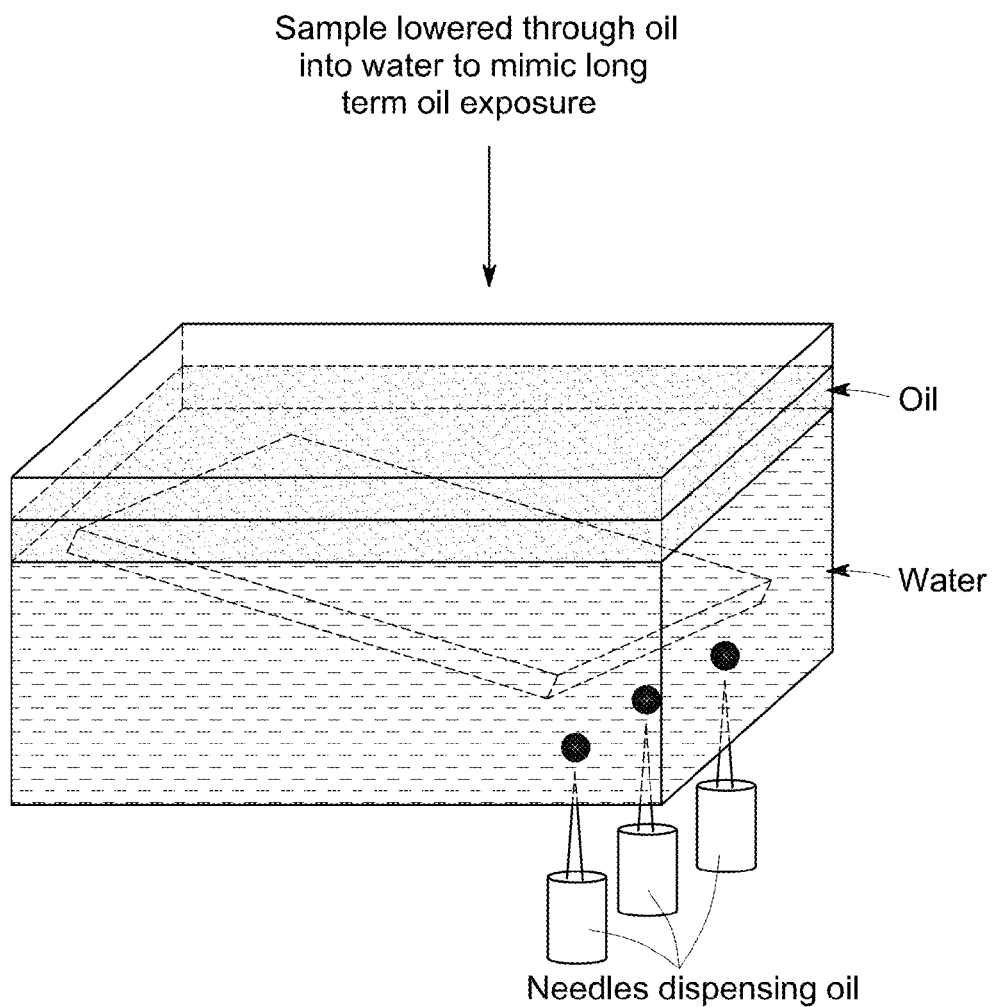
FIG. 9 illustrates a schematic layout of coalescence test setup in accordance with some embodiments of the invention.

A lab-scale coalescence efficiency test (FIG. 9) was designed for the plates prepared in Examples 1 and 2. From literature it is known that any surface that gets covered with an oil film/slick would dramatically lose its ability to capture impinging drops. Since one of the end applications of the coalescence plates is separation of oil-water emulsion in gravity separation vessels containing large quantities of oil, there is a high risk of oil completely covering these plates. Hence, the lab-scale test was not only designed to investigate coalescence probability/efficiency of plates but also their robustness when exposed to large quantities of oil, and also ability of these plates to constantly drain away coalesced oil.

Tests were conducted by immersing samples with patterned plates facing downwards inside an oil/water bath. The bath itself was a transparent container filled with approximately 90% by volume deionized (DI) water and 10% by volume Conoco Phillips base oil, which formed a layer over water. Oil was slowly added to the bath after adding water to ensure no free oil drops or emulsions were created in the process. Few minutes of settling allowed a distinct oil layer to be formed on top of water with no visible oil suspended in the water phase.

The bath also contained three needles positioned at different locations along the bottom wall. The needles were used to dispense oil drops of relatively uniform sizes and were supplied with oil from a syringe pump. Oil drops from needles were dispensed approximately at rate of 3-6 drops a minute per needle.

Example 3

Sample Preparation for Lab-Scale Tests

Before immersing freshly prepared plates into the water bath, the plates were squirted with deionized (DI) water to ensure that the hydrophilic regions on the plates were covered with water. Tested plates were further stored in DI water to avoid hydrophilic regions on the plates wicking in residual oil left on plates after testing. These plates were then retrieved from the storage water bath and quickly immersed into the test bath with oil/water.

Example 5

Test Procedure

Plates were tilted at an angle of about ~15-20° degrees from the horizontal plane, and immersed at a uniform rate into the oil/water bath using a Velmex linear stage. Immersion was stopped once the bottom of the plate came within a few millimeters of the needles that were projecting upwards. During immersion, the plate was forced to touch oil first, which resulted in formation of an oil film on top of the plate's surface. If the sample was designed correctly, this oil film was quickly displaced by water in the hydrophilic regions of the sample. A waiting period of few seconds to a minute (depending on the plate) was typically needed to allow water to displace oil, with water percolation starting at bottom of the plate and finishing at the top. If the oil film did not release completely from hydrophilic regions of sample, the sample was deemed to have failed the test and not tested further. This elimination criterion ensured that the chosen plates were robust enough to retain water on the hydrophilic regions after full exposure to oil.

Following the wait period, the plates were moved upwards by approximately one inch to allow enough room above the tip of the needles for oil drops to form and impinge on the sample. Oil drops were simultaneously dispensed at three locations on samples and the number of drops coalescing upon impingement was noted. Drops were counted as 'coalesced' if they attached to any region on the sample before reaching the oil/water interface. After 15-20 drops were dispensed, samples were either (a) moved horizontally so that oil drops would impinge at different locations or (b) removed from oil/water bath and immersed back within a few seconds into bath. A typical test involved dispensing of ~100 drops at different locations with at least three different conditions on a sample. Table 1 provides the details of tests conducted on Comparative Examples 1-2 and Example 1.

Figure 10:
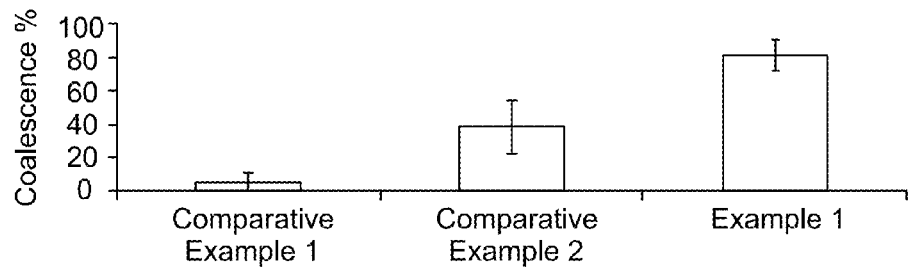
FIG. 10 shows the average coalescence efficiencies with 95% confidence for Comparative Examples 1-2 and Example 1.
Figure 11:
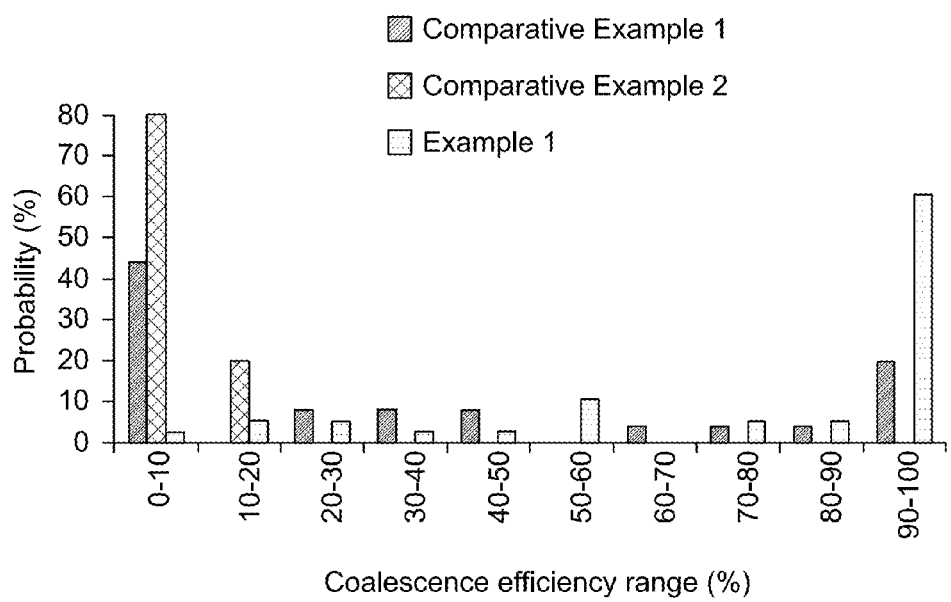
FIG. 11 shows coalescence efficiency histogram for tests conducted on Comparative Examples 1-2 and Example 1.

Plates used for generating the data shown in FIGS. 10 and 11 were also tested on different days by different operators. Further, for each type of surface, multiple samples were made and tested. All data were used to develop statistical confidence intervals for performance of each type of surface.

TABLE 1

| Example | Substrate | Coating material | Pattern material | Pattern type | Drop diameter (mm) |
|---|---|---|---|---|---|
| Comparative Example 1 | Stainless steel | None | None | None | 3-4 |
| Comparative Example 2 | Glass | Teflon | None | None | 3-4 |
| Example 1 | Roughened stainless steel | YAG | Teflon | FIG. 2 | 3-4 |

Results shown in FIG. 10 are consistent with the observations in literature that hydrophilic plates (Comparative Example 1) perform better than hydrophobic plates (Comparative Example 2) in separation tests. Further FIG. 10 also suggests that plates with hydrophilic/hydrophobic patterns (Example 1) have almost two times higher efficiency compared to conventional steel coalescing plates. FIG. 11 is a histogram of coalescence efficiencies obtained during each test iteration comprising impact of 15-20 drops on surface. Results shown in FIG. 11 show that steel plates (Comparative Example 1) have a highly variable performance which was consistent with the random patterns of oil drops formed on such plates. On the other hand, the hydrophobic/hydrophilic patterns of Example 1 create well-defined oil patterns on the surface and provide repeatedly high coalescence efficiencies.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

The invention claimed is:

1. An electrostatic coalescer for coalescing of a dispersed phase from a continuous phase in an emulsion, the electrostatic coalescer comprising:
   at least one inlet for receiving the emulsion;
   at least one outlet for discharging the emulsion after coalescing the dispersed phase;
   at least one electrode disposed between the inlet and the outlet, wherein the electrode is configured to receive an AC voltage/current from a power source; and
   at least one article disposed between the inlet and the outlet, the article comprising a plurality of regions disposed on a surface in a predefined pattern, wherein a portion of the plurality of regions is substantially wetting with respect to the dispersed phase, a portion of the plurality of regions is substantially non-wetting with respect to the dispersed phase and the pattern comprises a plurality of inter-connected regions that are substantially wetting or non-wetting with respect to the dispersed phase.

2. The electrostatic coalescer of claim 1, wherein the plurality of inter-connected regions define at least one flow path for the continuous phase.

3. The electrostatic coalescer of claim 1, wherein the pattern defines at least one flow path for a coalesced dispersed phase to drain from the surface.

4. The electrostatic coalescer of claim 1, wherein the pattern further comprises a plurality of disconnected regions that are substantially wetting with respect to the dispersed phase.

5. The electrostatic coalescer of claim 1, wherein the plurality of regions comprise hydrophobic regions.

6. The electrostatic coalescer of claim 5, wherein the hydrophobic regions comprise a fluorocarbon.

7. The electrostatic coalescer of claim 1, wherein the plurality of regions comprise superhydrophobic regions.

8. The electrostatic coalescer of claim 1, wherein the plurality of regions comprise textured hydrophilic regions.

9. The electrostatic coalescer of claim 1, wherein the plurality of regions comprise textured superhydrophilic regions.

10. The electrostatic coalescer of claim 9, wherein the textured superhydrophilic regions comprise a ceramic.

11. The electrostatic coalescer of claim 1, wherein the article is further configured to function as an electrode.

12. The electrostatic coalescer of claim 1, wherein the article comprises a substantially planar surface.

13. The electrostatic coalescer of claim 1, wherein the dispersed phase comprises an organic phase and the continuous phase comprises an aqueous phase.

14. The electrostatic coalescer of claim 1, wherein the dispersed phase comprises an aqueous phase and the continuous phase comprises an organic phase.

15. The electrostatic coalescer of claim 1, comprising a plurality of electrodes and the article.

16. The electrostatic coalescer of claim 15, further comprising the power source configured to supply the AC voltage/current to the plurality of electrodes.

17. The electrostatic coalescer of claim 1, wherein the coalescer is configured in-line of an emulsion fluid flow.

18. An electrostatic coalescer for coalescing of a dispersed phase from a continuous phase in an emulsion, the electrostatic coalescer comprising:
   at least one inlet for receiving the emulsion;
   at least one outlet for discharging the emulsion after coalescing the dispersed phase;
   a plurality of electrodes disposed between the inlet and the outlet, wherein the plurality of electrodes is configured to receive an AC voltage/current from a power source,
   wherein at least one electrode in the plurality of electrodes comprises a plurality of regions disposed on a surface in a predefined pattern, wherein a portion of the plurality of regions is substantially wetting with respect to the dispersed phase, and a portion of the plurality of regions is substantially non-wetting with respect to the dispersed phase.

* * * * *